United States Patent [19]

McGill

[11] 4,169,621
[45] Oct. 2, 1979

[54] BOTTLE GRIPPING DEVICE

[75] Inventors: Robert W. McGill, Munroe Falls; Ohio

[73] Assignee: A-T-O, Inc., Willoughby, Ohio

[21] Appl. No.: 845,460

[22] Filed: Oct. 25, 1977

[51] Int. Cl.² ............................................. B25B 11/00
[52] U.S. Cl. .................................................. 294/116
[58] Field of Search ........................ 294/116, 115, 90; 198/479, 653, 696; 279/37, 38; 214/113 A

[56] References Cited

U.S. PATENT DOCUMENTS

| | | | |
|---|---|---|---|
| 3,240,520 | 3/1966 | Dailey et al. | 279/37 |
| 4,055,943 | 11/1977 | Reichert | 294/116 |

*Primary Examiner*—James B. Marbert
*Attorney, Agent, or Firm*—Oldham, Oldham, Hudak & Weber

[57] ABSTRACT

Article gripping devices are provided wherein a pair of gripper jaws are pivotally carried on a frame means and a pair of opposed oppositely inclined camming surfaces positioned on a vertical axis on the frame engage a pair of vertically spaced cam follower surfaces formed on the gripper jaws whereby on relative vertical movement of the gripper jaws on the frame by a jaw carrier means, the gripper jaws are moved from bottle engaging to bottle releasing positions and with the position of the gripper jaws being positively controlled at all times.

9 Claims, 7 Drawing Figures

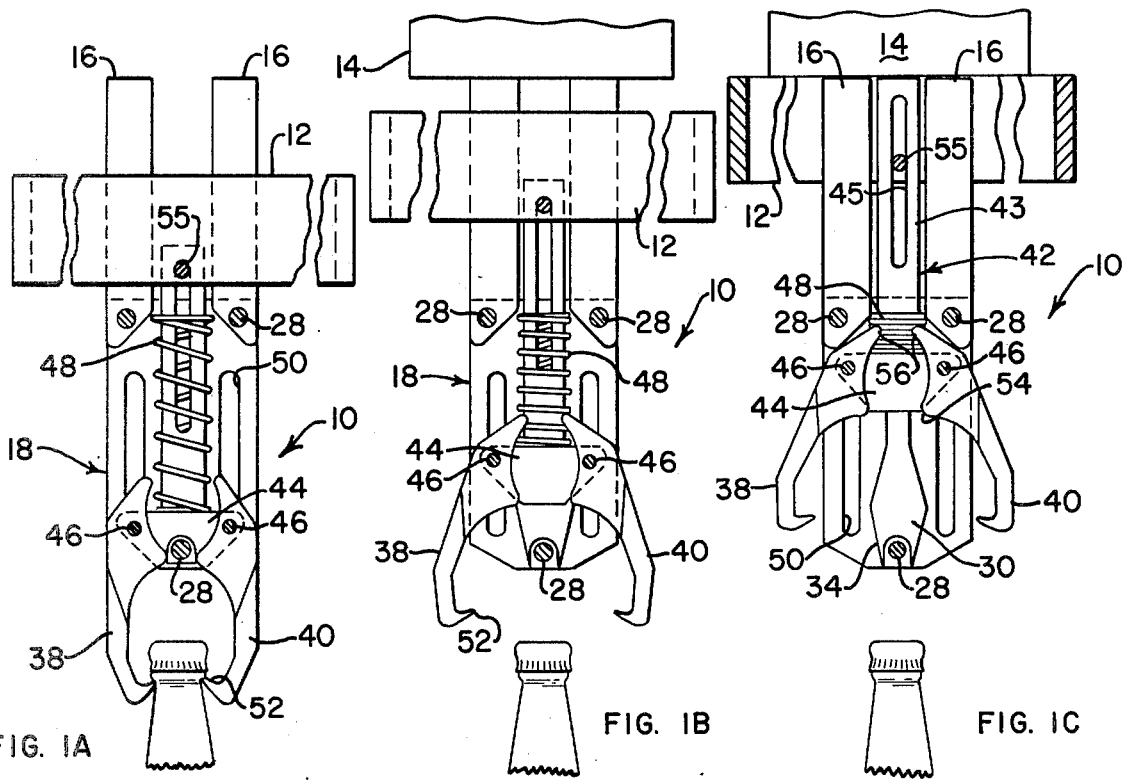
FIG. 1A  FIG. 1B  FIG. 1C
FIG. 1
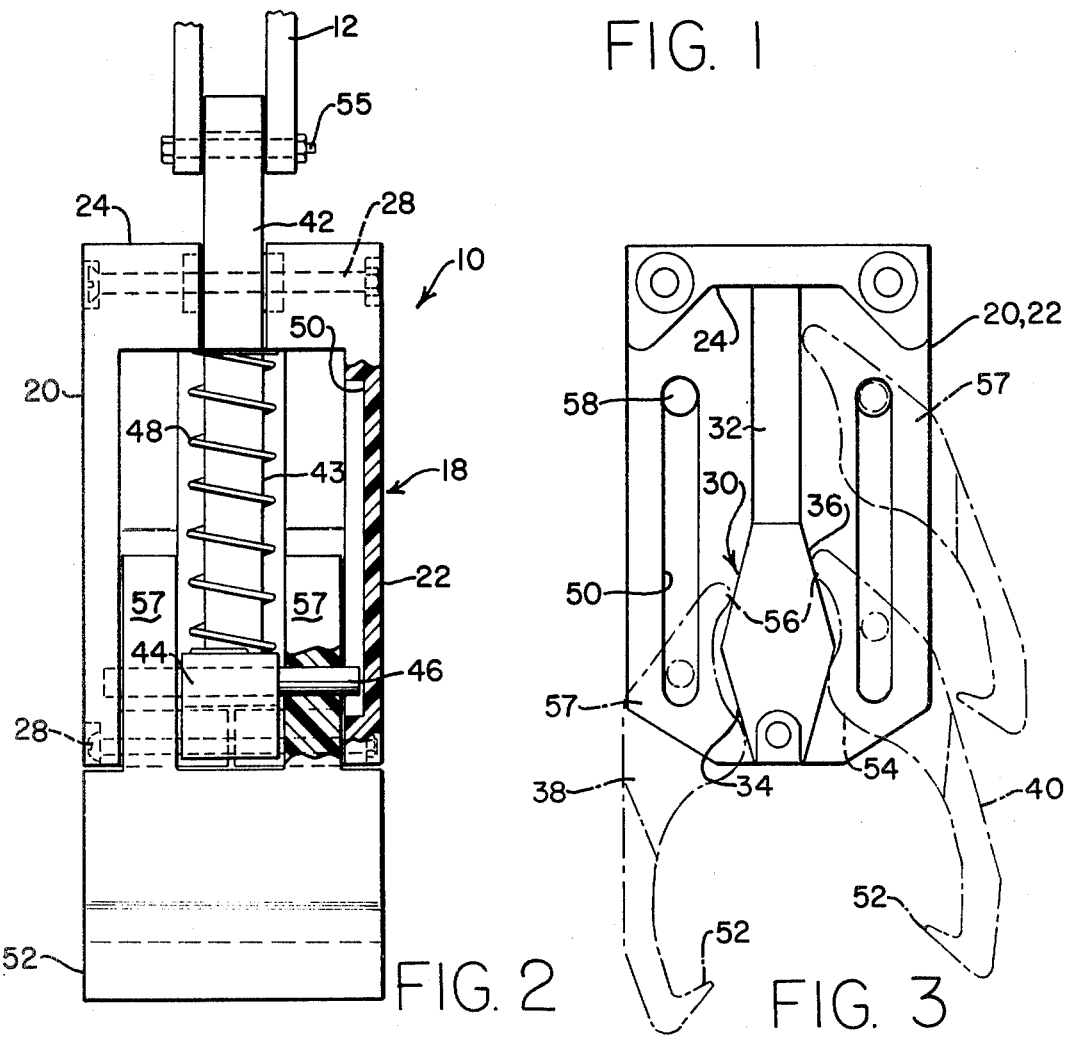
FIG. 2  FIG. 3

BOTTLE GRIPPING DEVICE

BACKGROUND OF INVENTION

In current article and bottle processing businesses, usually there are many thousands of articles or bottles that must be processed or handled rapidly for a variety of purposes, such as for placing the articles or bottles in a case, for withdrawing them from a case, or for other action. Naturally, it is very important that the article processing apparatus function automatically, rapidly and safely to handle a large number of articles in a minimum amount of time. Furthermore, it is desirable in many instances that the apparatus be adapted to function with articles of similar but varying shapes and sizes with a minimum, or no adjustment in the apparatus.

The apparatus of the invention is particularly designed for engaging bottles or articles in a case and for removing such articles therefrom for transfer to other apparatus for further processing or action.

There have been a number of patents issued heretofore on bottle grippers and on the processing of articles by automatic processing machines. Types of bottle grippers that have been used commercially and used successfully for some years include the structures shown in U.S. Pat. Nos. 3,125,369 and 3,125,370. Another type of article gripper is shown in U.S. Pat. No. 3,951,285 and this is a self actuating gripper normally positioned in longitudinally aligned rows for article engagement. The foregoing are representative patents on previous prior art structures, and the apparatus disclosed includes spring actuated gripper jaws that have functioned relatively satisfactorily. However, the gripper fingers or jaws do not have the positions thereof positively controlled at all times and little or no variation in the size of the article processed can be made. Also, it is possible that articles or bottles being carried or engaged by the gripper fingers might be released therefrom at undesirable times or in undesirable manners.

The general object of the present invention is to provide a novel and improved article gripper apparatus particularly characterized by its ability to control, positively, the position of the article gripper jaws or fingers at all times, both for article engaging and article release movement actions.

Another object of the invention is to provide special cams and cam follower members in article grippers for controlling article engaging action by relative movement between bottle gripper jaws and an associated frame means.

Another object of the invention is to provide an article gripper device which will automatically engage with articles that may vary somewhat in size and shape without any adjustment in the apparatus; and to compensate automatically for size variation in the articles processed.

Another object of the invention is to provide article gripper devices that can be made from plastic materials and be of sturdy construction whereby the devices will provide a long service life with a minimum of maintenance thereon, the devices also having a relatively few parts therein.

The foregoing and other objects and advantages of the invention will be made more apparent as the specification proceeds.

Attention now is directed to the accompanying drawings, wherein:

FIGS. 1A, 1B, and 1C are elevations, partially shown in vertical section and with one side of the positioning frame removed, of article gripper apparatus of the invention indicating article gripper, partially released, and fully released positions, respectively;

FIG. 2 is a side elevation, partially shown in vertical section, of the apparatus of FIG. 1 and with pin slots shown in the opposed side members of the frame;

FIG. 3 is a front elevational view of the apparatus of FIG. 1 with a side plate and the article gripper carrier member removed to show the side member inside surface and the cam surface thereon as well as to show the relationship of the gripper members to the frame side plate;

When referring to corresponding members shown in the drawings and referred to in the specification, corresponding numerals are used to facilitate comparison therebetween.

SUBJECT MATTER OF INVENTION

Figure 4:
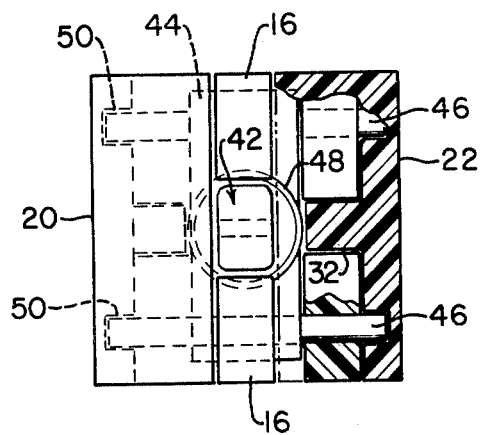
FIG. 4 is a top plan view, partially broken away and shown in horizontal section, of the apparatus of FIG. 1.
Figure 5:
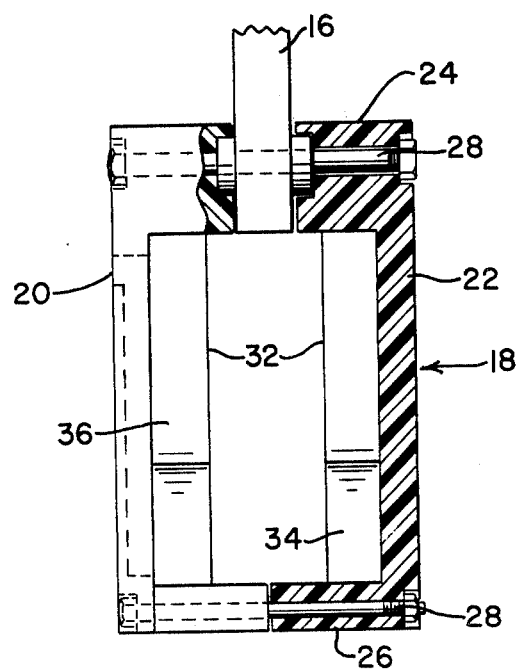
FIG. 5 is a side elevation of the front and rear plates of the frame and with the apparatus partially broken away and shown in vertical section and with the grippers removed to illustrate further details.

This invention relates to an article gripping device, which as one embodiment thereof, comprises a frame including a pair of opposed side plates, vertically directed cam means provided on the lower inside surface of the side plates, a gripper jaw carrier member slidably positioned on the frame between the side plates for movement on a vertical axis relative to the frame, a pair of gripper jaws individually pivotally carried by the jaw carrier member at a lower end thereof and positioned thereby in opposed relation between and protruding downwardly from the side plates of the frame, the gripper jaws having cam follower surfaces formed on upper inner portions thereof positioned to engage the cam means, and a spring urging the jaw carrier member to gripper jaw article engaging position, the cam follower surfaces of the gripper jaws engaging the cam means at all times for controlling the positions of the gripper jaws.

With reference to the details of the construction shown in the drawings, an article gripper device is indicated as a whole by the numeral 10. This device 10 is operatively positioned on a mounting means such as a carrier bar 12 which normally would extend transversely of an article processing apparatus and be engaged by conveyor chains or the like engaging ends of this bar and moving it through a fixed path for article or bottle engaging action by the device 10 to process the article or bottle in the desired manner and transport it from one location to a second location. As shown in prior patents like U.S. Pat. No. 3,125,369, normally a plurality of these article gripper devices 10 would be mounted in transversely spaced relationship on this carrier bar 12. A control cam 14 is normally fixedly positioned adjacent the path through which the carrier bar 12 is moved to engage the upper ends of control fingers 16 extending upwardly from the carrier bar 12. This cam means 14 causes the control fingers and a frame means 18 fixedly secured thereto to move downwardly with relation to the carrier bar and this provides bottle or article release action dependent upon the overall functioning of the apparatus with which the devices 10 and associated means are assembled and used. In the article gripping device, this frame means 18 includes a pair of opposed, spaced side plates 20 and 22 and, usually, a top member and a bottom member 24 and 26 that are positioned between opposed portions of the side plates 20 and 22. One half of the front to rear length of each member 24 and 26 can be formed as a unit with its adjacent side plate. The frame is assembled from a plurality of parts and suitable means, such as rivets or bolts 28, that extend through the frame from front to rear thereof for securing the components of the frame together.

As an important feature of the gripper device 10 of the invention, a vertically directed cam means 30 which includes a center rib 32 is formed on the inside face of each of the side plates 20 and 22. Such cam means specifically comprise a pair of flat cam surfaces including a lower upwardly and outwardly inclined surface 34 and an upper inwardly and upwardly inclined upper surface 36 connecting to the upper end of the lower surface 34. These cam surfaces 34 and 36 are formed on each side face of the rib 32 at its lower end.

A pair of gripper jaws 38 and 40 are mounted in opposed relationship by means such as a jaw carrier member 42 and these jaws extend from front to rear of the device 10. The gripper jaws 38 and 40 are positioned between the side plates 20 and 22 and extend downwardly therefrom, but with upper portions of the gripper jaws being pivotally connected to opposed portions of an enlarged lower end 44 of the jaw carrier member 42 as by positioning pins or rods 46. The jaw carrier member 42 is mounted on a vertical axis intermediate the side plates and it is positioned between the gripper fingers and on the frame for movement in relation to the frame on a vertical axis for jaw opening and closing action. Normally the lower end 44 of this jaw carrier member 42 is both laterally wider and also deeper in a front to rear direction than the cross sectional shape of the shank 43 of the jaw carrier member 42. The shank 43 extends up centrally of the frame through an opening in the top member 24 and the shank has a vertically extending slot 45 formed therein extending a major portion of its vertical length starting from a point near its top end to permit upward movement of the frame 18 re its carrier bar 12.

In order to aid in controlling the position of the gripper jaws 38, these pins 46 by which the gripper jaws or fingers are secured to the jaw carrier member extend in a direction of from front to rear of the device 10 beyond the margins of the gripper jaws, as indicated in FIG. 2 of the drawings. And, the inside surface of each of the side plates 20 and 22 has a pair of parallel vertically extending slots or recesses 50 formed in each one thereof and end portions of the pins 46 are received in these slots to aid in controlling the positioning and slide movement of the gripper jaws in relation to the frame means 18.

FIGS. 1A, 1B and 1C of the drawings best show that the gripper jaws 38 and 40 have inwardly and upwardly inclined fingers or hooks 52 formed at their lower ends and the opposed gripper jaws 38 and 40 are adapted to be moved from article engaging positions as shown in FIG. 1A to article release positions as shown in FIG. 1B. If further relative vertical movement of the jaw carrier member 42 to the frame is provided, then the jaws can be even further opened or moved to the position shown in FIG. 1C by the cam 14.

The jaw carrier member 42 normally has a coil spring 48 encompassing its shank 43 and compressed between the upper surface of its enlarged lower end 44 and the inner surface of the top member 24 of the frame for biasing the gripper jaws or fingers to closed or to the article engaging position whichever one is reached first. Closing movement of the gripper jaws and movement of the jaw carrier 42 in relation to the frame 18 terminates when the jaws 38 and 40 engage an article. Upward movement of these gripper jaws or of the frame 18 is only resiliently or lightly resisted in the apparatus and thus an accidental striking of an object or article when the jaws are down in the position shown in FIG. 1A, the gripper jaw assembly may be moved upwardly as the slot 45 permits a rivet or bolt 55 securing the gripper jaw carrier 42 to the carrier bar 12 to be moved to a lower portion of the slot.

The control action for the gripper jaws 38 and 40 is particularly provided by a pair of cam follower surfaces 54 and 56 that are formed in spaced vertical relation on upper, inner portions of each of the gripper jaws as shown in FIG. 3 of the drawings. One such cam follower surface 54 is vertically below the pins 46 on which the gripper jaws are mounted and the other surface 56 is above the pin. These cam follower surfaces 54 and 56 are formed on upper arms 57,57 adjacent the lateral margins of the gripper jaws as positioned between the side plates 20 and 22 to engage the cam means 30. The lower end of the jaw carrier member 42 is received between the arms 57,57.

It should be noted that the two cam follower surfaces 54 and 56 normally are individually engaged with the lower cam surface 34 and upper cam surface 36, respectively, at all times, so that opening and closing movement of the gripper jaws in relation to each other is positively controlled and the gripper jaws are not free for any undesired article release movement. The length of the gripper jaw opening and closing movements will control the size of the article to be grasped and hence a plurality of articles of generally similar sizes and shapes could be engaged by the device 10 of the invention without any adjustment therein except, usually, the extent of movement of the article gripping device 10 in relation to the carrier bar 12 that can be varied to control the extent of the opening and closing movement of the jaws.

Preferably the relative movement of the gripper jaw assembly and frame 18 is not longer than the effective length of engagement of the arcuate cam followers 54 and 56 with the flat cam surfaces 34 and 36. Obviously low friction contact between such cam surfaces is provided.

The side plates or cam carrying plates 20 and 22 preferably have holes 58 formed therethrough at the upper ends of the slots 50 to facilitate inserting the mounting shafts as pins 46 for the gripper jaws. Suitable clearances are present in the frame 18, and associated parts, to permit use of such assembly procedures.

The gripper device of the invention can be made from any suitable material and usually a plastic material that can be worked readily and which has a low coefficient of friction, but yet is relatively rigid and has good strength for use in structures of the type of those of the present invention. The apparatus has relatively few parts and a very efficient article engaging, transporting and carrying action can be obtained by the gripper devices of the invention. Hence, it is believed that the objects of the invention have been achieved.

While one complete embodiment of the invention has been disclosed herein, it will be appreciated that modification of this particular embodiment of the invention may be resorted to without departing from the scope of the invention.

What is claimed is:

1. In an article gripping device, the combination of a frame including a pair of opposed, spaced side plates, each side plate having a lower upwardly and outwardly inclined cam surface and an upper inwardly and upwardly inclined cam surface connecting to the upper end of said lower surface,
   - a gripper jaw carrier member slidably positioned on said frame between said side plates for movement on a vertical axis relative to said frame,
   - a pair of gripper jaws pivotally carried by said jaw carrier member at a lower end thereof and positioned in opposed relation between and protruding downwardly from said side plates, cam follower surfaces being formed on upper portions of said gripper jaws and engaging said cam surfaces, said cam follower surfaces comprising a pair of vertically spaced surfaces on each gripper jaw with the two cam follower surfaces of each gripper jaw normally concurrently engaging each of said two cam surfaces to control, positively, the positions of said gripper jaws as changed by the relative vertical position of said jaw carrier member on said frame, and
   - a spring urging the jaw carrier member to gripper jaw article engaging position, said cam follower surfaces engaging said cam surfaces at all times to control the position of said gripper jaws.

2. In an article gripping device as in claim 1 where the positions of said gripper jaws are controlled by the relation of said jaw carrier member to said frame, pin means pivotally secure said gripper jaws to said jaw carrier member at upper portions of said gripper jaws, and said cam surfaces and cam follower surfaces are normally engaged at two vertically spaced areas at all times, one of which areas is above and one of which is below said pin means.

3. In an article gripping device, the combination of;
   - a frame including a pair of opposed spaced side plates,
   - a vertically directed cam means on the lower inside surface of each of said side plates,
   - a jaw carrier member slidably positioned on said frame between said side plates for movement on a vertical axis,
   - a pair of gripper jaws pivotally carried by said jaw carrier member at a lower portion thereof and protruding downwardly from said side plates, said gripper jaws each having a pair of upwardly extending ears thereon that extend up along opposite faces of the lower end of said jaw carrier member, cam follower surfaces being formed on said gripper jaw ears and operatively engaging said cam means, and
   - a spring urging the frame and jaw carrier member to gripper jaw article engaging positions, said cam follower surfaces operatively engaging said cam means to control the positions of said gripper jaws by relative movement between said frame and said jaw carrier member.

4. In an article gripping device as in claim 3 where pin means pivotally secure said gripper jaws to said jaw carrier means, and said pin means operatively engage said side plates for parallel vertical movement.

5. In an article gripping device as in claim 4, where said gripper jaws and said cam means are formed from low friction plastic material.

6. In an article gripping device as in claim 3 where said cam means comprise a pair of flat generally vertically directed surfaces forming an apex, and said cam follower surfaces on each gripper jaw ear are vertically spaced from each other to provide two vertically spaced cam engaging areas one for each of said surfaces.

7. In an article gripping device and associated means, the combination of
   - an open centered frame including a pair of opposed spaced side members,
   - a pair of vertically directed and vertically spaced cam means operatively associated with said side plates,
   - a gripper jaw carrier member slidably positioned between said side members for movement on a vertical axis,
   - a pair of gripper jaws pivotally carried by said jaw carrier member at a lower portion thereof and protruding downwardly from said side members, a pair of vertically spaced cam follower surfaces formed on upper portions of said gripper jaws and normally operatively engaging said cam means, and
   - means for moving said jaw carrier member vertically on said frame, said cam follower surfaces operatively engaging said cam means to control the positions of said gripper jaws by relative movement between said frame and said jaw carrier member.

8. In a device assembly as in claim 7 where said cam means comprise a pair of flat generally vertically directed converging surfaces and a pair of flat generally vertically directed diverging surfaces connecting to form an apex, said gripper jaws are positioned on shaft members engaging said gripper jaws intermediate the vertical margins thereof, and said cam follower surfaces on each said gripper jaw are vertically spaced from each other to provide two vertically spaced cam engaging areas one for each of said pairs of vertically directed surfaces.

9. In a device and assembly as in claim 7 where resilient means urge said jaw carrier means downwardly of said frame, and said gripper jaws and carrier means can be moved upwardly in relation to said frame.

* * * * *